United States Patent [19]
Utsumi et al.

[11] 3,969,252
[45] July 13, 1976

[54] DIELECTRIC CERAMIC COMPOSITIONS OF BATIO$_3$-BAZRO$_3$-CATIO$_3$ SYSTEM

[75] Inventors: Kazuaki Utsumi; Tomeji Ohno, both of Tokyo, Japan

[73] Assignee: Nippon Electric Company, Ltd., Tokyo, Japan

[22] Filed: Sept. 16, 1974

[21] Appl. No.: 506,040

[30] Foreign Application Priority Data
Sept. 19, 1973 Japan.............................. 48-106204

[52] U.S. Cl.............................. 252/63.2; 252/63.5; 106/73.31; 317/259
[51] Int. Cl.$^2$..................... H01B 3/00; B61C 11/00
[58] Field of Search................... 252/63.5, 63.2, 63; 106/73.31, 62.9

[56] References Cited
UNITED STATES PATENTS 2,402,517 6/1946 Wainer............................ 106/73.31
3,013,977 12/1961 Berman............................ 106/73.31
3,704,266 11/1972 Ueoka et al. ...................... 252/63.5

FOREIGN PATENTS OR APPLICATIONS
598,038 2/1948 United Kingdom................ 252/63.2

*Primary Examiner*—John D. Welsh
*Attorney, Agent, or Firm*—Hopgood, Calimafde, Kalil, Blaustein and Lieberman

[57] ABSTRACT

A dielectric material is provided consisting essentially of a composition based on the general formula:

$$(BaTiO_3)_x \cdot (BaZrO_3)_y \cdot (CaTiO_3)_z,$$

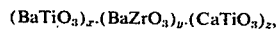

wherein $x=y=z=1.0$ and in which x, y and z have the following ranges: $0.4 \leq x \leq 0.89$, $0.1 \leq y \leq 0.3$ and $0.01 \leq z \leq 0.3$, respectively, said composition also containing between 0.001 wt% and 0.5 wt% $SiO_2$ and between 0.01 mol% and 3 mol% $TiO_2$.

1 Claim, No Drawings

DIELECTRIC CERAMIC COMPOSITIONS OF BATIO₃-BAZRO₃-CATIO₃ SYSTEM

This invention relates to dielectric ceramic compositions having a high permittivity, a low loss and an improved time-stability of permittivity.

When employing ceramic compositions in capacitors, it is desirable that such compositions have a high permittivity and good temperature- and time-stability of permittivity. A low dielectric loss is also required for such use. Recently, various ceramic compositions containing BaTiO₃ as principal component have been proposed for high-permittivity capacitors. However, when a ceramic composition has a permittivity of 10,000 or more, many limitations are encountered in practice, such as high temperature dependence of permittivity, very narrow range of operating temperature, and deterioration of time-stability. In particular, change in permittivity with the lapse of time amounts to 5%/decade or more in the case of the prior ceramic compositions with permittivites of 10,000 or more. Thus, it has not been possible to obtain a long operating life with capacitors formed of these compositions, e.g. 20 years or longer.

It is an object of this invention to provide ceramic materials for capacitors having improved high permittivity, low dielectric loss, good temperature-stability of permittivity, and improved time-stability of permittivity as compared to prior dielectric ceramic materials.

The ceramic composition of this invention comprises a three-component BaTiO₃-BaZrO₃-CaTiO₃ system as the principal constituent with controlled additions of SiO₂ and TiO₂. By virtue of the presence of these particular constituents, the temperature-stability and time-stability of permittivity have been remarkably improved, while providing high permittivity at room temperature.

The features and advantages of this invention will be appreciated by the following description.

In producing the ceramic compositions according to the examples of this invention, the starting materials comprise powders having a purity of 99% or more of BaCO₃, TiO₂, ZrO₂, CaCO₃, and SiO₂. Suitable amounts of the powders are weighed out and mixed in a ball-mill together. After filtering and drying, the mixture is prefired at 1,200°C for 2 hours. The material so produced is crushed and then pressed into disks of 16 mm in diameter and 1 mm in thickness. These disks are sintered at a temperature within the range of 1350°–1410°C for 1 hour. The resultant disk is coated on both sides with the silver paste and fired at 600°C to form silver electrodes. The permittivity ($\epsilon$) and the dielectric loss (tan$\delta$) of the resultant materials are measured at a frequency of 1 KHz by using a capacitance bridge. The permittivity is measured within the temperature range of −30° to +85°C. The temperature variation coefficients of permittivity are calculated on the basis of the values of permittivity at 20°C, respectively, and both the maximum and minimum values of the temperature variation coefficients are shown in Table 1. The values of the permittivity and the dielectric loss at 20°C are also shown in Table 1.

In addition, the resultant ceramic disks are allowed to stand at room temperature for 1,000 hours after the silver electrodes are formed thereon, and their permittivities are measured to calculate time variation coefficients of permittivity $A_\epsilon$ (%/decade) according to the following equation:

$$A_\epsilon = \frac{\epsilon_t - \epsilon_0}{\epsilon_0 \cdot \text{Log}(t/12)} \times 100 \quad \%/\text{decade},$$

wherein t represents the time elapsed after electrodes are formed, $\epsilon_0$ represents the value of permittivity after a period of time of 12 hours after formation of electrodes, and $\epsilon_t$ represents the value of permittivity after a period of time of t hours.

The above equation of $A\epsilon$ is well known in the art and, for example, described in an article appearing in the Ceramic Bulletin, vol. 34, No. 12, 1955, by M. C. Mcquarrie and W. R. Ruessem, pages 402 to 406.

The expression Log (t/12) in the foregoing equation applies for values of "t" of over 12 hours, the basic permittivity $\epsilon_0$ denoting the value of permittivity after a period of time of 12 hours following formation of the electrodes.

Typical examples of the obtained results are shown in Table 1.

In Table 1, compositions specified by Sample No. 1-3, 16 and 17 are outside the scope of this invention.

The comparison between the data of Nos. 1–3, 16 and 17 and those of Nos. 4–15 clearly shows that the compositions having no additive or only one of the additions TiO₂ or SiO₂ cannot be sintered sufficiently. The comparison also shows that the values of temperature variation coefficient, the time variation coefficient of permittivity and the dielectric loss (tan δ) are quite large.

On the other hand, compositions having both additives of SiO₂ and TiO₂ exhibit markedly improved properties in the time-stability of permittivity, the temperature-stability of permittivity and in the dielectric loss, while maintaining high permittivity. Thus, it is clear that the ceramic compositions of this invention are particularly suitable for use in electronic equipments, especially in electronic computers, which require high reliability and a stability for a long period of time.

Where the amount of TiO₂ addition of the basic constituents is less than 0.01 mol% or where the amount of SiO₂ added to the basic constituents is less than 0.001 wt%, the sintering cannot be performed adequately. Moreover, tan δ and the time variation coefficient of increase are adversely affected. Where the amount of TiO₂ addition is in excess of 3 mol% or where the amount of SiO₂ addition is in excess of 0.5 wt%, the range of sintering temperature which can produce a good sintered body is narrowed to less than 5°C, thereby adversely affecting reproducibility.

Where the amount of BaTiO₃ in the principal constituent is less than 40 mol%, the value of permittivity falls below 7,000. Where the amount of BaTiO₃ is more than 89 mol%, the temperature variation coefficient of $\epsilon$ rises beyond 80%. In both these cases, the materials are impractical.

Where the amount of BaZrO₃ in the principal constituent is less than 10 mol% or more than 30 mol%, the value of $\epsilon$ at 20°C falls below 7,000 and hence the material becomes impractical.

Where the amount of CaTiO₃ in the principal constituent is less than 1 mol%, the temperature variation coefficient of $\epsilon$ increases beyond 80%, whereas, the amount of CaTiO₃ of more than 30 mol% causes decrease in the value of $\epsilon$ below 7,000 and an increase in tan δ. In both of these cases, the materials are not practical.

In view of the facts mentioned above, the ceramic composition of this invention should have as the principal constituent the three-component $BaTiO_3$-$BaZrO_3$-$CaTiO_3$ system composition in accordance with the following general formula:

$$(BaTiO_3)_x \cdot (BaZrO_3)_y \cdot (CaTiO_3)_z,$$

wherein $x+y+z=1.0$ and $x$, $y$ and $z$ represent numbers in the ranges of $0.40 \leq x \leq 0.89$, $0.10 \leq y \leq 0.30$, and $0.01 \leq z \leq 0.30$, respectively. The ceramic composition should further contain as additives $SiO_2$ in an amount between 0.001 and 0.5 wt% and $TiO_2$ in an amount between 0.01 and 3 mol%.

Table 1

| Sample No. | Principal Constituents | | | Additives | | $\epsilon$ at 20°C | $\tan \delta \times 10^{-2}$ at 20°C | Temperature Variation Coefficient of $\epsilon$ % (−30~+85°C) | Time Variation in Coefficient of $\epsilon$ % / decade |
|---|---|---|---|---|---|---|---|---|---|
| | $BaTiO_3$ mol % | $BaZrO_3$ mol % | $CaTiO_3$ mol % | $TiO_2$ mol % | $SiO_2$ wt % | | | | |
| 1 | 68 | 22 | 10 | — | — | measurement impossible because of poor sintering | | | |
| 2 | 68 | 22 | 10 | — | 0.05 | 10850 | 3.0 | 0 ~ −85 | −8 |
| 3 | 68 | 22 | 10 | 1 | — | 9800 | 2.5 | 0 ~ −80 | −9 |
| 4 | 68 | 22 | 10 | 1 | 0.001 | 12300 | 1.03 | 0 ~ −76 | −1.6 |
| 5 | 68 | 22 | 10 | 1 | 0.02 | 11500 | 0.72 | 0 ~ −75 | −0.6 |
| 6 | 68 | 22 | 10 | 1 | 0.05 | 11200 | 0.36 | 0 ~ −70 | −0.8 |
| 7 | 68 | 22 | 10 | 1 | 0.50 | 10990 | 0.54 | 0 ~ −64 | −0.8 |
| 8 | 67 | 23 | 10 | 0.01 | 0.05 | 12240 | 1.04 | +3 ~ −66 | −1.7 |
| 9 | 67 | 23 | 10 | 0.5 | 0.05 | 11500 | 0.91 | +3 ~ −67 | −1.2 |
| 10 | 67 | 23 | 10 | 1.0 | 0.05 | 10970 | 0.33 | +5 ~ −67 | −1.5 |
| 11 | 67 | 23 | 10 | 3.0 | 0.05 | 10500 | 0.48 | +4 ~ −64 | −1.0 |
| 12 | 70 | 10 | 30 | 1 | 0.05 | 8950 | 0.55 | +15 ~ −50 | −0.7 |
| 13 | 69 | 30 | 1 | 1 | 0.05 | 8620 | 0.64 | +20 ~ −60 | −0.9 |
| 14 | 89 | 10 | 1 | 1 | 0.05 | 8530 | 0.72 | +30 ~ −50 | −0.8 |
| 15 | 40 | 30 | 30 | 1 | 0.05 | 8340 | 0.68 | +17 ~ −45 | −1.5 |
| 16 | 89 | 10 | 1 | 1 | — | 7500 | 2.3 | +45 ~ −80 | −6.8 |
| 17 | 40 | 30 | 30 | — | 0.05 | 7000 | 4.4 | +20 ~ −50 | −7.2 |

What is claimed is:

1. A method of improving the time stability of permittivity properties of a dielectric ceramic consisting essentially of a composition determined by the general formula: $(BaTiO_3)_x \cdot (BaZrO_3)_y \cdot (CaTiO_3)_z$, wherein $x+y+z = 1.0$ and $x$, $y$ and $z$ have the following ranges, respectively: $0.4 \leq x \leq 0.89$, $0.1 \leq y \leq 0.3$ and $0.01 \leq z \leq 0.3$ which comprises, adding to said composition between 0.001 wt.% to 0.5 wt.% $SiO_2$ and between 0.01 mol% to 3 mol% $TiO_2$.

* * * * *